United States Patent Office 3,141,854
Patented July 21, 1964

3,141,854
PREPARATION OF CATALYSTS FOR THE POLYMERIZATION OF EPOXIDES
Frederick E. Bailey, Jr., Charleston, and Haywood G. France, South Charleston, W. Va., assignors to Union Carbide Corporation, a corporation of New York
No Drawing. Filed June 29, 1960, Ser. No. 39,465
11 Claims. (Cl. 252—428)

This invention relates to the preparation of compositions which are catalytically active for the polymerization of vicinal-epoxyhydrocarbons, preferably those which have a single vicinal epoxy group and which are free from unsaturation other than benzenoid unsaturation.

The compositions prepared in accordance with the teachings disclosed herein can be advantageously and effectively employed as catalysts in the suspension polymerization of, for example, ethylene oxide to produce high molecular weight solid poly(ethylene oxide). It is pointed out at this time that the term "suspension polymerization process," as used herein including the appended claims, refers to polymerization in the presence of an inert, normally-liquid organic vehicle in which the monomeric reagent employed is soluble and the resulting polymeric product is insoluble.

The novel compositions of the invention are prepared by the mutual reaction and/or interaction of an alkaline earth metal hexammoniate, an olefin oxide, and a dialkyl sulfoxide. The reaction is carried out in a liquid ammonia medium. In principle, the reaction temperature can range from above about the freezing point of ammonia, i.e., about −78° C., to the critical temperature of ammonia, i.e., about +133° C. The preservation of a liquid ammonia phase obviously requires pressurized equipment at reaction temperatures above the atmospheric boiling point of ammonia, i.e., about −33° C. A reaction temperature in the range of from above about the freezing point of the liquid ammonia medium to about 25° C., and higher, is suitable. In a preferred aspect, the upper temperature limitation is about 10° C.

The ratio of the three components, i.e., alkaline earth metal hexammoniate, olefin oxide, and dialkyl sulfoxide, can be varied over a wide range. Thus, highly desirable catalytic compositions can be prepared by employing from about 0.3 to 1.0 mol of olefin oxide per mol of metal hexammoniate, and from about 0.2 to 0.8 mol of dialkyl sulfoxide per mol of metal hexammoniate. Extremely desirable catalytic compositions can be prepared by employing from about 0.4 to 1.0 mol of olefin oxide per mol of metal hexammoniate, and from about 0.3 to 0.6 mol of dialkyl sulfoxide per mol of metal hexammoniate. It should be noted that the alkaline earth metal hexammoniate, $M(NH_3)_6$, wherein M can be calcium, barium, or strontium, contains alkaline earth metal in the zero valence state. Thus, the concentration or mol ratio of the olefin oxide and the dialkyl sulfoxide is more conveniently based upon alkaline earth metal per se rather than alkaline earth metal hexammoniate.

The olefin oxides contemplated in the preparation of the novel catalytic compositions are free from ethylenic and acetylenic unsaturation, and they contain solely carbon, hydrogen, and a single oxirane oxygen which is bonded to adjacent carbon atoms to form a vicinal epoxy group, i.e.,

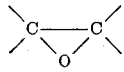

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like. Propylene oxide is most preferred.

The dialkyl sulfoxides which are employed in the preparation of the novel catalytic compositions have the following formula:

(I) 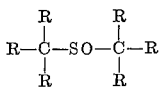

wherein each R, individually, can be hydrogen or an alkyl radical, with the proviso that at least two R variables are always hydrogen atoms. Typical alkyl radicals include, for example, methyl, ethyl, n-propyl, isopropyl, n-butyl, isobutyl, t-butyl, n-pentyl, isopentyl, n-hexyl, 2-ethylhexyl, and the like. The dialkyl sulfoxides characterized by Formula I supra contain at least two (and up to six) free or active hydrogen atoms monovalently bonded to the carbon atoms which are alpha to the sulfinyl group, i.e., —SO—.

Illustrative dialkyl sulfoxides include, for instance, dimethyl sulfoxide, methyl ethyl sulfoxide, methyl n-propyl sulfoxide, methyl isopropyl sulfoxide, methyl n-butyl sulfoxide, methyl isobutyl sulfoxide, methyl t-butyl sulfoxide, methyl n-pentyl sulfoxide, methyl 2-ethylhexyl sulfoxide, diethyl sulfoxide, ethyl n-propyl sulfoxide, ethyl isopropyl sulfoxide, ethyl n-butyl sulfoxide, di-n-propyl sulfoxide, n-propyl n-butyl sulfoxide, di-n-butyl sulfoxide, and the like. The di(lower alkyl) sulfoxides are preferred; the methyl lower alkyl sulfoxides are highly preferred. Dimethyl sulfoxide is most preferred. It should be noted that by the term "lower alkyl," as used herein, is meant an alkyl radical which contains from 1 to 4 carbon atoms.

The preparation of the novel catalytic compositions can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and dialkyl sulfoxide reagents, preferably as a mixture. If desired, the olefin oxide and the dialkyl sulfoxide reagents can be added separately. However, it is preferred that the separate addition of said reagents to the ammonia solution be conducted simultaneously. During the catalyst preparation, agitation of the reaction mixture is desirable. Subsequently, the Dry-Ice acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried, if desired, in an inert normally-liquid organic vehicle such as, for example, the lower dialkyl ethers of alkylenes glycols, e.g., dimethyl ether, diethyl ether, or dipropyl ether of ethylene glycol, of propylene glycol, of diethylene glycol, and the like; saturated aliphatic and cycloaliphatic hydrocarbons, e.g., hexane, heptane, octane, cyclohexane, cyclopentane, cycloheptane, lower alkyl substituted-cyclohexane, methylcyclohexane, and the like.

The compositions of the invention are useful in catalyzing the polymerization of vicinal-epoxyhydrocarbons. Illustrative vicinal-epoxyhydrocarbon monomers include the epoxidized mono-olefinic hydrocarbons and the epoxidized mono-cycloolefinic hydrocarbons, e.g., ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadecane, 1,2 - epoxyoctadecane, 5 - benzyl-2,3 - epoxyheptane, 4-cyclohexyl-2,3-epoxypentane, styrene oxide, ortho-, meta-, and para-ethylstyrene oxide, 7-oxabicyclo[4.1.0]heptane, 6-oxabicyclo[3.1.0]hexane, 4 - propyl-7-oxabicyclo[4.1.0]heptane, 3-amyl-6-oxabicyclo[3.1.0]hexane, and the like. Other vicinal-epoxyhydrocarbons include, for example, butadiene monoxide, 3-vinyl-7-oxabicyclo[4.1.0]heptane, 3-epoxyethyl-7-oxabicyclo[4.1.0]heptane, butadiene dioxide, and the like. Epoxidized mono-olefins which contains from 2 to 4 carbon atoms are preferred.

The compositions of the invention are employed in catalytically significant quantities. In general, a catalyst concentration in the range of from about 0.02, and lower, to about 10, and higher, weight percent, based on the weight of total monomeric feed, is suitable. A catalyst concentration in the range of from about 0.1 to about 3 weight percent, based on the weight of total monomeric feed is preferred. For optimum results, the particular catalyst employed, its preparation, the nature of the vicinal-epoxyhydrocarbon monomer(s) employed, the temperature at which the polymerization reaction is conducted, and other factors will largely determine the desired catalyst concentration.

The polymerization reaction can be conducted over a wide temperature range. Depending on various factors such as the nature of the vicinal-epoxyhydrocarbon monomer(s) employed, the particular catalyst employed, the concentration of the catalyst, and the like, the reaction temperature can be as low as —30° C. and as high as +150° C., and higher. A suitable temperature range is from about 0° C. to about 150° C. For the preparation of granular ethylene oxide polymers (which preparation is a highly preferred embodiment) a reaction temperature below about 70° C. is suitable. Though granular poly(ethylene oxide) can be prepared at a reaction temperature of about 65°–70° C., the poly(ethylene oxide) product tends to accumulate on the interior surfaces of the reaction equipment. Consequently, it is preferred that the reaction temperature for the preparation of granular poly(ethylene oxide) be in the range of from about —30° C. to 65° C., and preferably still from about 0° to 60° C. In an extremely desirable aspect, the polymerization reaction is conducted below about the softening point of the resulting granular poly(ethylene oxide) product. Agitation of the reaction mixture is necessary in order to maintain catalyst suspended in said reaction mixture during the course of the suspension polymerization of ethylene oxide.

In general, the reaction time will vary depending on the operative temperature, the nature of the vicinal-epoxyhydrocarbon monomer(s) employed, the particular catalyst employed, the concentration of the catalyst, the surface area of the catalyst, the use of an inert, normally-liquid organic vehicle, and other factors. The reaction time can be as short as minutes in duration or it can be as long as several days.

When polymerizing an admixture containing two different vicinal-epoxyhydrocarbons, the proportions of said vicinal-epoxyhydrocarbons can vary over the entire range. Preferably the concentration of either monomeric vicinal-epoxyhydrocarbon is in the range of from about 5 to about 95 weight percent, based on the total weight of said vicinal-epoxyhydrocarbons.

The polymerization reaction preferably takes place in the liquid phase. Preferably, the polymerization reaction is conducted under an inert atmosphere, e.g., nitrogen. It is also highly desirable to effect the polymerization process under substantially anhydrous conditions. Impurities such as water, aldehyde, carbon dioxide, and oxygen which may be present in the monomeric feed and/or reaction equipment are to be avoided.

The polymerization reaction can be carried out via the bulk, suspension, or solution polymerization routes. The suspension and solution techniques involve the use of an inert normally-liquid organic medium such as, for instance, the aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; the normally-liquid saturated hydrocarbons including the open chain, cyclic, and alkyl-substituted cyclic saturated hydrocarbons such as, the hexanes, the heptanes, the octanes, 2-ethylhexane, cyclopentane, cyclohexane, cycloheptane, the lower alkyl substituted-cyclopentanes, the lower alkyl substituted-cyclohexanes, the lower alkyl substituted-cycloheptanes, various normally-liquid petroleum hydrocarbon fractions, decahydronaphthalene, and the like.

Granular poly(ethylene oxide) can be prepared via the suspension polymerization route by polymerizing ethylene oxide in the presence of alkaline earth metal amide or alkaline earth metal amide-alcoholate as catalysts therefor. However, these granular ethylene oxide polymers are exceedingly high molecular weight products which oftentimes have average molecular weights as high as several million. While such exceedingly high molecular weight polymers have commercial utility for a wide variety of applications and uses, such polymers must be molecularly degraded for various other uses and applications. For instance, where the uses intended for the polymer require a high concentration of solids in solution without producing a solution that is extremely viscous so as to be difficult to handle or process, a relatively low molecular weight polymer is desired. It should be borne in mind, also, that the molecular weight degradation of relatively high molecular weight polymers by mechanical or physical means is an added inconvenience and uneconomical. However, it has been observed that relatively low molecular weight granular ethylene oxide polymers, i.e., those which have a reduced viscosity value in the range of from about 0.4 to 5, and higher, can be prepared via the suspension polymerization of ethylene oxide in the presence of the novel catalytic compositions of the invention. This result was, indeed, highly unexpected and unobvious. As indicated previously, the suspension polymerization reaction is carried out in the presence of an inert, normally-liquid organic vehicle in which the monomer employed is soluble and the polymer produced is insoluble. Typical inert vehicles include the normally-liquid saturated hydrocarbons illustrated above.

The polymers prepared in accordance with the teachings disclosed herein are a useful class of compounds which can range from the liquid state to the tough, solid state. The ethylene oxide polymers which have a reduced viscosity value in the range of from about 0.4 to about 5, and higher, are especially desirable compounds.

The polymers are useful as thickeners, lubricants, sizing agents, and the like. The water-soluble and water-insoluble solid polymers are also useful in the preparation of films by conventional techniques such as by milling on a two-roll mill, calendering, solvent casting, and the like.

By the term "reduced viscosity," as used herein including the appended claims, is meant a value obtained by dividing the specific viscosity by the concentration of the polymer in solution, the concentration being measured in grams of polymer per 100 milliliters of solvent at a given temperature. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile, at 30° C.

The following examples are illustrative.

*Example 1*

To a 2-liter glass resin flask equipped with a stirrer, thermometer, inlet conduit in the lower portion of the flask, and an outlet conduit connected to an exhaust system, there were charged 100 grams of liquid ethylene oxide, one liter of heptane, and a quantity of calcium amide, Ca(NH$_2$)$_2$, which contained 1.0 gram of calcium calculated as the metal. Gaseous ethylene oxide was introduced into the resin flask via the inlet conduit and bubbled through the resulting mixture during the course of the polymerization reaction. Excess ethylene oxide was removed via the outlet conduit. In this manner, the reaction medium was continuously saturated with ethylene oxide. The polymerization reaction was maintained at 18° to 31° C. for a period of 7 hours. The resulting finely-divided polymer was recovered from the reaction product by filtration, followed by drying same at room temperature under reduced pressure. There were obtained 32 grams of granular poly(ethylene oxide) which had a reduced viscosity value in acetonitrile of 48.0.

*Example 2*

To a 500 cc. Parr bomb maintained in Dry Ice-acetone bath, there were charged 5 grams of calcium metal, 2.6 grams of liquid ethylene oxide, and 87 grams of liquid ammonia. The Parr bomb was then removed from the Dry Ice-acetone bath and placed in an ice-water bath. After 2 hours at approximately 0° C., a steady pressure of 100 p.s.i.g. was noted. Of this pressure about 47 p.s.i.g. was due to ammonia and about 53 p.s.i.g. was due to hydrogen. After the steady pressure noted above was obtained, the bomb was vented and the product slurried in heptane.

To the equipment described in Example 1, there were charged one liter of heptane and a quantity of the catalyst slurry prepared as described above, said catalyst slurry containing 1.0 gram of calcium calculated as the metal. Ethylene oxide was bubbled through the resulting mixture in the same manner as explained in Example 1. The polymerization reaction was maintained at 25° to 38° C. for a period of 7 hours. The resulting finely-divided polymer was recovered from the reaction product by filtration, followed by drying same at room temperature under reduced pressure. There were obtained 114 grams of white, granular poly(ethylene oxide) which had a reduced viscosity value in acetonitrile of 55.8.

*Example 3*

Liquid ammonia (300 milliliters) was added to a one liter flask (maintained in a Dry Ice-acetone bath, the temperature of which was about −70° C.). Calcium metal nodules (5 grams) was then dissolved in the stirred liquid ammonia. The characteristic deep blue color of calcium hexammoniate appeared. To the resulting solution there was slowly added an admixture of dimethyl sulfoxide (4.88 grams) and 1-2-propylene oxide (7.26 grams). During the addition of said admixture, the blue color of the calcium hexammoniate solution disappeared; the resulting reaction mixture was grayish-white in color. The external Dry Ice-acetone bath then was removed, and the flask was exposed to room temperature conditions, i.e., approximately 22° C., for about 6 hours. After this period of time, the liquid ammonia phase had disappeared (weathered or evaporated from the system) and a gray-white solid product remained. This gray-white solid product plus 80 milliliters of heptane were added to a mortar, and the resulting admixture was ground until a fine suspension in heptane was obtained. Titration of the resulting suspension revealed that 22.2 milliliters of said suspension contained one gram of calcium (calculated as the metal).

*Example 4*

To the equipment described in Example 1, there were charged 650 milliliters of heptane and a quantity of the catalyst suspension prepared as described in Example 3, said catalyst suspension containing 1.0 gram of calcium calculated as the metal. Ethylene oxide was bubbled through the resulting mixture in the same manner as explained in Example 1. The polymerization reaction was maintained at 23° to 40° C. for a period of 5 hours. The resulting finely-divided polymer was recovered from the reaction product by filtration, washed with heptane, followed by drying same at 30° C. under reduced pressure. There were obtained 52 grams of white, granular poly(ethylene oxide) which had a reduced viscosity value in acetonitrile of 2.2.

*Example 5*

A catalyst suspension was prepared in the same manner as set forth in Example 3 except that 11.01 grams instead of 7.26 grams of 1,2-propylene oxide were used. Titration of the resulting suspension revealed that 32 milliliters of said suspension contained one gram of calcium (calculated as the metal).

To the equipment described in Example 1, there were charged 650 milliliters of heptane and a quantity of the catalyst suspension prepared as described above, said catalyst suspension containing 1.0 gram of calcium calculated as the metal. Ethylene oxide was bubbled through the resulting mixture in the same manner as explained in Example 1. The polymerization reaction was maintained at 25° to 42° C. for a period of 5 hours. The resulting finely-divided polymer was recovered from the reaction product by filtration, washed with heptane, followed by drying same at approximately 30° C. under reduced pressure. There were obtained 26 grams of white, granular poly(ethylene oxide) which had a reduced viscosity value in acetonitrile of 0.4.

The catalyst prepared as set forth in the first paragraph of this example is effective, also, in homopolymerizing propylene oxide at a temperature of about 85° C. to yield a water-insoluble, polymeric product.

*Example 6*

A catalyst suspension was prepared in the same manner as set forth in Example 3 except that 2.44 grams instead of 4.88 grams of dimethyl sulfoxide was employed. Titration of the resulting suspension revealed that 20 milliliters of said suspension contain 0.9 gram of calcium (calculated as the metal).

To the equipment described in Example 1, there were charged 650 milliliters of heptane and a quantity of the catalyst suspension prepared as described above, said catalyst suspension containing 0.9 gram of calcium calculated as the metal. Ethylene oxide was bubbled through the resulting mixture in the same manner as explained in Example 1. The polymerization reaction was maintained at 23° to 37° C. for a period of 5 hours. The resulting finely-divided polymer was recovered from the reaction product by filtration, washed with heptane, followed by drying same at approximately 30° C. under reduced pressure. There were obtained 15.5 grams of white, granular poly(ethylene oxide) which had a reduced viscosity value in acetonitrile of 0.6.

A catalyst prepared in the same manner as set forth in the first paragraph of this example using, however, approximately 10 grams of strontium in lieu of 5 grams of calcium is effective in copolymerizing a mixture of ethylene oxide (90 parts by weight) and propylene oxide (10 parts by weight) at 95° C. to give a solid, water-soluble, polymeric product.

*Example 7*

A catalyst is prepared in the same manner as set forth in Example 3 except that 4.9 grams of ethylene oxide and 6.5 grams of diethyl sulfoxide are used in lieu of 7.26 grams of 1,2-propylene oxide and 4.88 grams of dimethyl sulfoxide, respectively.

To the equipment described in Example 1, there are charged one liter of heptane, 100 grams of liquid ethylene oxide, and a quantity of the catalyst suspension prepared as described above, said catalyst suspension containing 1.0 gram of calcium calculated as the metal. Ethylene oxide is bubbled through the resulting mixture in the same manner as explained in Example 1. The polymerization reaction is maintained at 28° to 40° C. for a period of 5 hours. The resulting finely-divided polymer is recovered from the reaction product by filtration, and then is dried at room temperature under reduced pressure. There is obtained a white, granular, water-soluble polymeric product.

A catalyst prepared in the same manner as set forth in the first paragraph of this example, using, however, about 16 grams of barium in lieu of 5 grams of calcium is effective in copolymerizing a mixture of ethylene oxide (75 parts by weight) and 1,2-epoxybutane (25 parts by weight) at 90° C. to give a water-soluble, polymeric product.

*Example 8*

A catalyst is prepared in the same manner as set forth in Example 3 except that 9.0 grams of 1,2-epoxybutane and 9.2 grams of methyl n-butyl sulfoxide are used in lieu of 7.26 grams of 1,2-propylene oxide and 4.88 grams of dimethyl sulfoxide, respectively.

To the equipment described in Example 1, there are charged one liter of heptane, 100 grams of liquid ethylene oxide, and a quantity of the catalyst suspension prepared as described above, said catalyst suspension containing 1.0 gram of calcium calculated as the metal. Ethylene oxide is bubbled through the resulting mixture in the same manner as explained in Example 2. The polymerization reaction is maintained at 22° to 39° C. for a period of 5 hours. The resulting finely-divided polymer is recovered from the reaction product by filtration, and then is dried at room temperature under reduced pressure. There is obtained a white, granular, water-soluble polymeric product.

Although the invention has been illustrated by the preceding examples, the invention is not to be construed as limited to the materials employed in the above-exemplary examples, but rather, the invention encompasses the generic area as hereinbefore disclosed. Various modifications and embodiments of this invention can be made without departing from the spirit and scope thereof.

What is claimed is:

1. A process which comprises reacting alkaline earth metal hexammoniate with from about 0.3 to 1.0 mol of olefin oxide and from about 0.2 to 0.8 mol of dialkyl sulfoxide, based on 1.0 mol of said alkaline earth metal hexammoniate, said dialkyl sulfoxide containing from two to six hydrogen atoms monovalently bonded to the carbon atoms which are alpha to the sulfinyl group, said olefin oxide being free from ethylenic and acetylenic unsaturation and being composed of carbon, hydrogen, and a single oxirane group, said reaction being conducted in an excess liquid ammonia medium, and subsequently evaporating from the resulting product mixture the excess liquid ammonia.

2. A process which comprises reacting alkaline earth metal hexammoniate with from about 0.4 to 1.0 mol of olefin oxide and from about 0.3 to 0.6 mol of di(lower alkyl) sulfoxide, based on 1.0 mol of said alkaline earth metal hexammoniate, said di(lower alkyl)sulfoxide containing from two to six hydrogen atoms monovalently bonded to the carbon atoms which are alpha to the sulfinyl group, said olefin oxide being free from ethylenic and acetylenic unsaturation and being composed of carbon, hydrogen, and a single oxirane group, said reaction being conducted in an excess liquid ammonia medium, under operative conditions sufficient to maintain said ammonia medium in an essentially liquid state, and subsequently evaporating from the resulting product mixture the excess liquid ammonia.

3. The process of claim 2 wherein said reaction is conducted at a temperature in the range of from above about the freezing point of ammonia to about 25° C. under a pressure sufficient to maintain said ammonia in an essentially liquid state.

4. The process of claim 3 wherein said reaction is conducted at a temperature in the range of from above about the freezing point of ammonia to about 10° C. under a pressure sufficient to maintain said ammonia in an essentially liquid state.

5. A process which comprises reacting alkaline earth metal hexammoniate with from about 0.4 to 1.0 mol of lower olefin oxide of the group consisting of ethylene oxide, propylene oxide, 1,2-epoxybutane, and 2,3-epoxybutane and from about 0.3 to 0.6 mol of di(lower alkyl) sulfoxide, based on 1.0 mol of said alkaline earth metal hexammoniate, said di(lower alkyl) sulfoxide containing from two to six hydrogen atoms monovalently bonded to the carbon atoms which are alpha to the sulfinyl group, said reaction being conducted in an excess liquid ammonia medium, at a temperature in the range of from above about the freezing point of ammonia to about 25° C., under a pressure sufficient to maintain said ammonia in an essentially liquid state, and subsequently evaporating from the resulting product mixture the excess liquid ammonia.

6. The process of claim 5 wherein the solid product remaining after the evaporation of the excess liquid ammonia therefrom is slurried in an inert, normally-liquid organic vehicle.

7. The process of claim 6 wherein said inert, normally-liquid organic vehicle is an inert, normally-liquid saturated hydrocarbon.

8. The process of claim 7 wherein said inert, normally-liquid saturated hydrocarbon is heptane.

9. The process of claim 5 wherein said alkaline earth metal hexammoniate is calcium hexammoniate, wherein said lower olefin oxide is ethylene oxide, and wherein said di(lower alkyl) sulfoxide is methyl lower alkyl sulfoxide.

10. The process of claim 5 wherein said alkaline earth metal hexammoniate is calcium hexammoniate, wherein said lower olefin oxide is propylene oxide, and wherein said di(lower alkyl) sulfoxide is methyl lower alkyl sulfoxide.

11. The process of claim 10 wherein said methyl lower alkyl sulfoxide is dimethyl sulfoxide.

References Cited in the file of this patent

UNITED STATES PATENTS

| | | |
|---|---|---|
| 2,369,524 | Berg et al. | Feb. 13, 1945 |
| 2,844,545 | Barkovec | July 22, 1958 |
| 2,866,761 | Hill et al. | Dec. 30, 1958 |
| 2,939,846 | Gordon et al. | June 7, 1960 |
| 2,969,402 | Hill et al. | Jan. 24, 1961 |